(12) United States Patent
Kwon et al.

(10) Patent No.: US 7,573,731 B2
(45) Date of Patent: Aug. 11, 2009

(54) ACTIVE-CLAMP CURRENT-SOURCE PUSH-PULL DC-DC CONVERTER

(75) Inventors: Bong Hwan Kwon, Pohang (KR); Jung Min Kwon, Pohang (KR)

(73) Assignees: Postech Academy-Industry Foundation, Pohang (KR); Postech Foundation, Pohang (KR)

( * ) Notice: Subject to any disclaimer, the term of this patent is extended or adjusted under 35 U.S.C. 154(b) by 355 days.

(21) Appl. No.: 11/466,825

(22) Filed: Aug. 24, 2006

(65) Prior Publication Data

US 2007/0247877 A1    Oct. 25, 2007

(30) Foreign Application Priority Data

Apr. 19, 2006  (KR) .................... 10-2006-0035324

(51) Int. Cl.
*H02M 3/335*    (2006.01)
*H02H 7/122*    (2006.01)
(52) U.S. Cl. ..................................... 363/25; 363/56.06
(58) Field of Classification Search ................. 363/16, 363/24–26, 56.01, 56.06–56.08
See application file for complete search history.

(56) References Cited

U.S. PATENT DOCUMENTS

| 4,158,881 | A  | * | 6/1979 | Simmons et al. ............... 363/25 |
| 6,191,960 | B1 | * | 2/2001 | Fraidlin et al. ................ 363/25 |
| 6,272,027 | B1 | * | 8/2001 | Fraidlin et al. ................ 363/26 |
| 7,193,868 | B2 | * | 3/2007 | Yasumura ..................... 363/25 |
| 7,196,914 | B2 | * | 3/2007 | Ren et al. ................ 363/21.14 |

* cited by examiner

*Primary Examiner*—Matthew V Nguyen
(74) *Attorney, Agent, or Firm*—Rothwell, Figg, Ernst & Manbeck

(57) ABSTRACT

Provided is a current-source push-pull DC-DC converter using an active clamp circuit for reusing energy of leakage inductances by not only diodes on a secondary side of a transformer being zero-current switched using a series-resonant full-wave rectifier, but also the active clamp circuit on a primary side of the transformer, which provides a discharge path of the energy stored in the leakage inductances, increases power conversion efficiency even for a wide input voltage range and reduces a switch voltage stress as compared to a conventional current-source push-pull circuit by operating even for a duty ratio below 0.5 by flowing a current of an input inductor through capacitors of the active clamp circuit when both main switches are off.

7 Claims, 5 Drawing Sheets

US 7,573,731 B2

ACTIVE-CLAMP CURRENT-SOURCE PUSH-PULL DC-DC CONVERTER

CROSS-REFERENCE TO RELATED PATENT APPLICATION

This application claims the benefit of Korean Patent Application No. 10-2006-0035324, filed on Apr. 19, 2006, in the Korean Intellectual Property Office, the disclosure of which is incorporated herein in its entirety by reference.

1. FIELD OF THE INVENTION

The present invention relates to an active-clamp current-source push-pull DC-DC converter, and more particularly, to a current-source push-pull DC-DC converter comprising the diodes on a secondary side of a transformer to be zero-current switched using a series-resonant full-wave rectifier, and the active clamp circuit on a primary side of the transformer providing a discharge path of the energy stored in the leakage inductances to reuse energy of leakage inductance.

The present invention also relates to an active-clamp current-source push-pull DC-DC converter increasing the power conversion efficiency of the current-source push-pull DC-DC converter even for a wide input voltage range and reducing a switch voltage stress as compared to a conventional current-source push-pull circuit by operating even for a duty ratio below 0.5 by flowing a current of an input inductor through capacitors of the active clamp circuit when both main switches are off.

2. DESCRIPTION OF THE RELATED ART

As well known to those of ordinary skill in the art, when an input voltage is low and an output voltage is high for 1~2 KW DC-DC converters, a current-source push-pull DC-DC converter illustrated in FIG. 1 is generally used to attain a high efficiency. An operation of the current-source push-pull DC-DC converter illustrated in FIG. 1 will now be described.

Two switches $S_1$ and $S_2$ have the same duty ratio and a phase difference of half a period. The duty ratio is $T_{on}/T_s$, where $T_s$ denotes a switching time and $T_{on}$ denotes a conduction time. Since the duty ratio of the switches $S_1$ and $S_2$ is always greater than 0.5, a state where all of the switches $S_1$ and $S_2$ are off does not exist. When all the switches $S_1$ and $S_2$ are on, a voltage over a primary winding of a transformer $T_1$ is 0, and energy is stored in an input inductor L. When only one of the switches $S_1$ and $S_2$ is on, an input voltage $V_i$ and the energy stored in the input inductor L is transferred to the secondary side of the transformer $T_1$. This is similar to an operation of a boost converter, ripples of an input current are few, and the conduction time of the switches $S_1$ and $S_2$ are long, thereby having a small switch conduction loss. Thus, the conventional current-source push-pull DC-DC converter illustrated in FIG. 1 is suitable when the input voltage $V_i$ is low and the input current is high. In FIG. 1, it will be understood by those of ordinary skill in the art that $C_d$ denotes a capacitor for removing an AC component, which can be included in the DC input voltage $V_i$, $C_o$ denotes a capacitor for removing an AC component, which can be included in an output voltage Vo, and $D_1$ and $D_2$ denote diodes for constructing a center-tap full-wave rectifier with a secondary winding of the transformer $T_1$. Thus, detailed description of the components $C_d$, $C_o$, $D_1$ and $D_2$ is omitted in the present specification.

However, since the duty ratio of the switches $S_1$ and $S_2$ is always greater than 0.5 in the conventional current-source push-pull DC-DC converter, a period of time in which the switches $S_1$ and $S_2$ are on at the same time exists. Thus, a range of the use of the duty ratio is narrow, and thereby, a maximum voltage over the switches $S_1$ and $S_2$ is higher than the maximum input voltage, and it is difficult for the conventional current-source push-pull DC-DC converter to operate for wide input range. In addition, a passive snubber circuit mainly used to prevent a switching component from being damaged due to energy stored in a leakage inductance of the transformer $T_1$ reduces the converter power conversion efficiency.

SUMMARY OF THE INVENTION

The present invention provides a current-source push-pull DC-DC converter comprising the diodes on a secondary side of a transformer to be zero-current switched using a series-resonant full-wave rectifier, and the active clamp circuit on a primary side of the transformer providing a discharge path of the energy stored in the leakage inductances to reuse energy of leakage inductance.

The present invention also provides a current-source push-pull DC-DC converter using an active clamp circuit for increasing a power conversion efficiency of the converter even for a wide input voltage range and reducing a switch voltage stress as compared to a conventional current-source push-pull circuit by operating even for a duty ratio below 0.5 by flowing a current of an input inductor through capacitors of the active clamp circuit when both main switches are off.

According to an aspect of the present invention, there is provided a current-source push-pull DC-DC converter comprising a primary circuit and a secondary circuit divided by a transformer, wherein: the primary circuit, which is a current-source push-pull circuit, comprises an input inductor L, two main switches $S_1$ and $S_2$, and an active clamp circuit comprising two sub-switches $S_3$ and $S_4$ and clamp capacitors $C_{c1}$ and $C_{c2}$; and the secondary circuit is a full-wave output rectifier.

The full-wave output rectifier may be a series-resonant full-wave rectifier and comprise two diodes $D_1$ and $D_2$ and resonant capacitors $C_{r1}$ and $C_{r2}$.

The full-wave output rectifier may be a center-tap full-wave rectifier and comprise two diodes $D_1$ and $D_2$.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
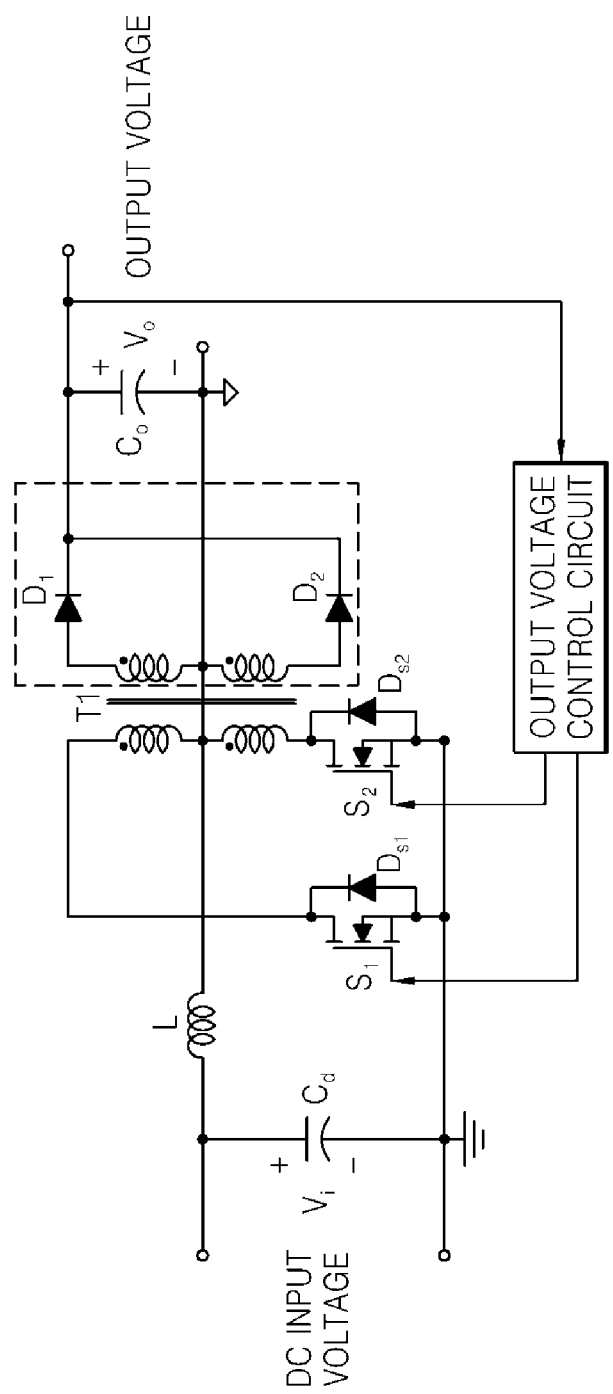
FIG. 1 illustrates a circuit diagram of a conventional current-source push-pull DC-DC converter.

The present invention will now be described more fully with reference to the accompanying drawings, in which exemplary embodiments of the invention are shown. In the following description, well-known functions or constructions are not described in detail since they would obscure the invention in unnecessary detail. However, the terminology described below is defined considering functions in the present invention and may vary according to a user or application. Thus, the definitions should be understood based on all the contents of the specification.

In the description below, if the elements in the present invention are the same as elements in the prior art, reference numerals used in the prior art are used as present in the prior art, and their detailed description is omitted.

FIG. 1 is a circuit diagram of a conventional current-source push-pull DC-DC converter.

Referring to FIG. 1, the active-clamp current-source push-pull DC-DC converter according to the present invention solves the problems of the conventional current-source push-pull DC-DC converter illustrated in FIG. 1 by applying an active clamp circuit to a primary side of a transformer.

Figure 2:
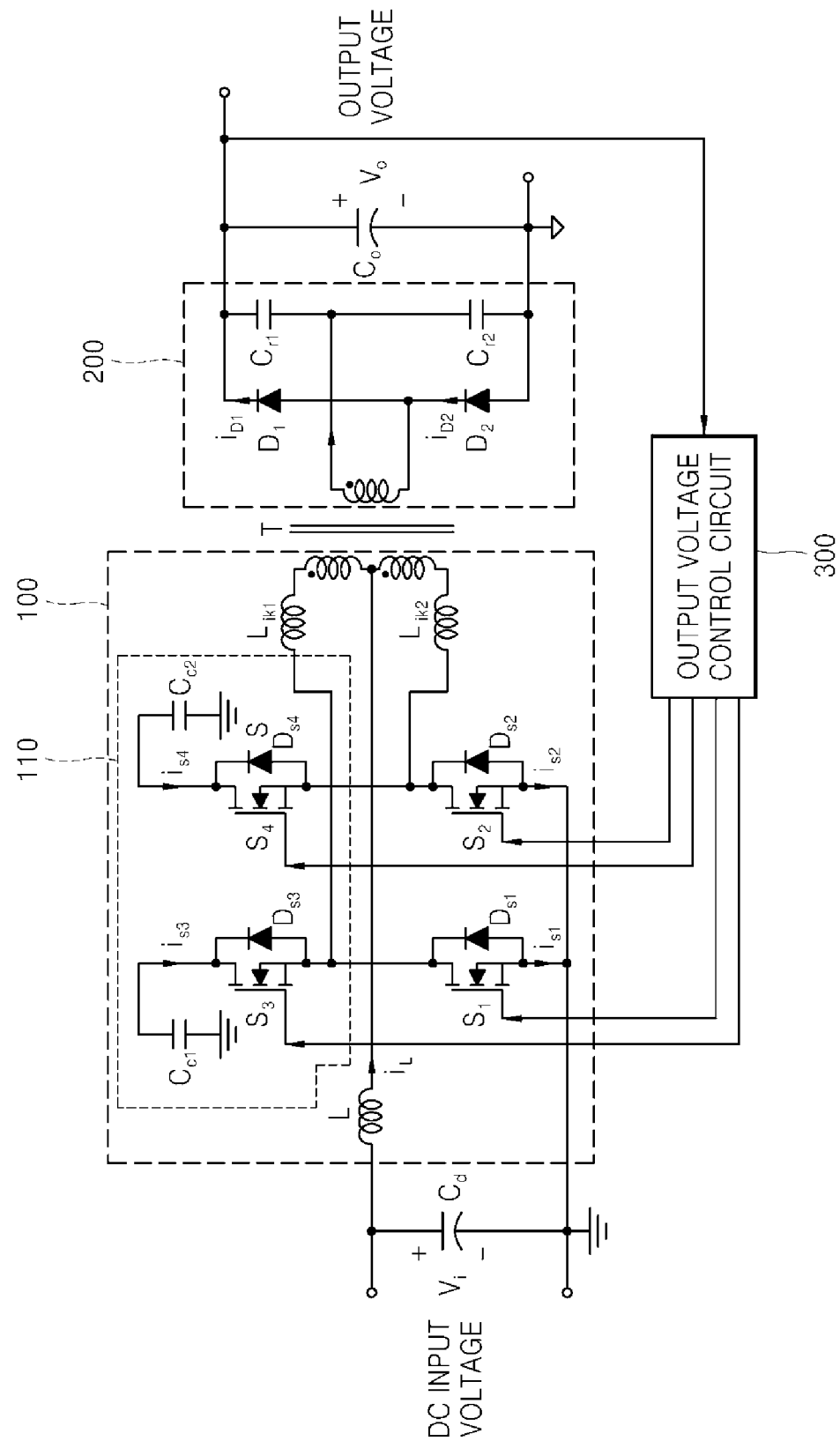
FIG. 2 illustrates a circuit diagram of an active-clamp current-source push-pull DC-DC converter according to an embodiment of the present invention.

FIG. 2 is a circuit diagram of an active-clamp current-source push-pull DC-DC converter according to an embodiment of the present invention.

Referring to FIG. 2, a primary side of the active-clamp current-source push-pull DC-DC converter, i.e., a primary side of a transformer T, includes an input inductor L, two main switches $S_1$ and $S_2$, and an active clamp circuit 110. A circuit forming the primary side of the transformer T is an active-clamp current-source push-pull circuit 100. The active clamp circuit 110 included in the active-clamp current-source push-pull circuit 100 includes two sub-switches $S_3$ and $S_4$ and clamp capacitors $C_{c1}$ and $C_{c2}$.

A secondary side of the active-clamp current-source push-pull DC-DC converter is a series-resonant full-wave rectifier 200 and includes two diodes $D_1$ and $D_2$ and resonant capacitors $C_{r1}$ and $C_{r2}$.

The transformer T electrically isolates the primary side and the secondary side of the active-clamp current-source push-pull DC-DC converter. An output voltage $V_o$ of the active-clamp current-source push-pull DC-DC converter is adjusted by adjusting duty ratios of the main switches $S_1$ and $S_2$ by being fed back to an output voltage control circuit 300, which is widely known to those of ordinary skill in the art.

Figure 3A:
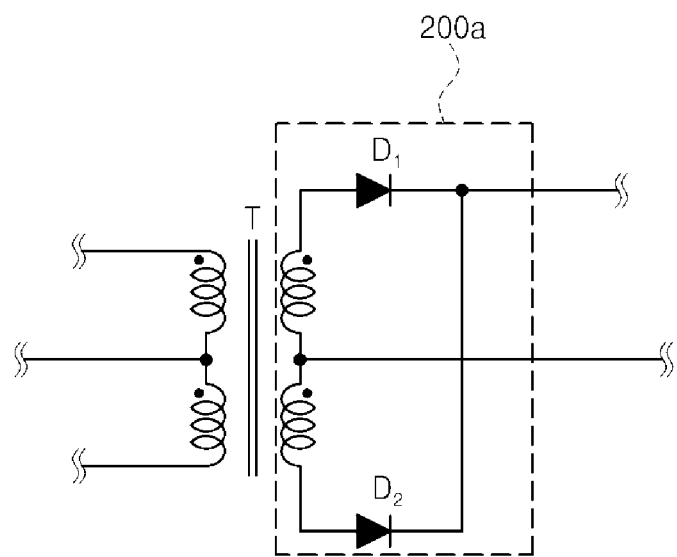
FIG. 3A illustrates a circuit diagram of a center-tap full-wave rectifier, which can be used on a secondary side of an active-clamp current-source push-pull DC-DC converter according to an embodiment of the present invention.
Figure 3B:
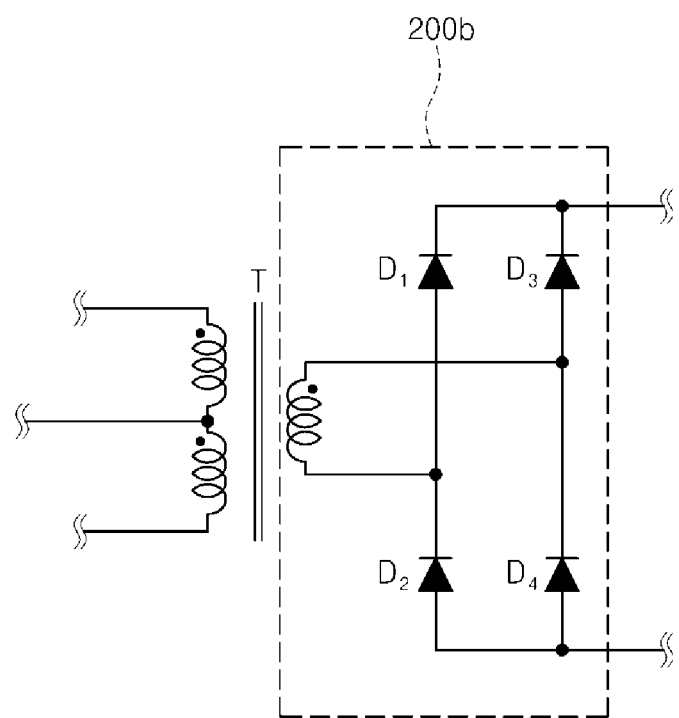
FIG. 3B illustrates a circuit diagram of a full-bridge full-wave rectifier, which can be used on a secondary side of an active-clamp current-source push-pull DC-DC converter according to an embodiment of the present invention.

FIGS. 3A and 3B are circuit diagrams of a center-tap full-wave rectifier 200a and a full-bridge full-wave rectifier 200b, which can be used on the secondary side of the active-clamp current-source push-pull DC-DC converter illustrated in FIG. 2, according to an embodiment of the present invention. The series-resonant full-wave rectifier 200 on the secondary side of the active-clamp current-source push-pull DC-DC converter illustrated in FIG. 2 can be replaced by the center-tap full-wave rectifier 200a or the full-bridge full-wave rectifier 200b, each having a different characteristic as described below.

The center-tap full-wave rectifier 200a illustrated in FIG. 3A has a structure including a minimum number of elements $D_1$ and $D_2$. However, since a voltage stress applied to each of the diodes $D_1$ and $D_2$ is high, the center-tap full-wave rectifier 200a is suitable when the output voltage $V_o$ is relatively low.

The full-bridge full-wave rectifier 200b illustrated in FIG. 3B has a structure including four diodes $D_1$, $D_2$, $D_3$, and $D_4$. Thus, a voltage applied to each of the diodes $D_1$, $D_2$, $D_3$ and $D_4$ is very low. However, since more diodes are included in the full-bridge full-wave rectifier 200b, the full-bridge full-wave rectifier 200b is suitable when the output voltage $V_o$ is high.

The series-resonant full-wave rectifier 200 used on the secondary side of the active-clamp current-source push-pull DC-DC converter illustrated in FIG. 2 has a relatively simple structure. Thus, a voltage applied to each diode of the series-resonant full-wave rectifier 200 is equal to the output voltage $V_o$, and each diode is zero-current switched, thereby reducing a loss due to a diode reverse recovery current. Accordingly, the series-resonant full-wave rectifier 200 illustrated in FIG. 2 has a very high power conversion efficiency for a converter in which relatively high power conversion is required for a high output voltage.

Figure 4A:
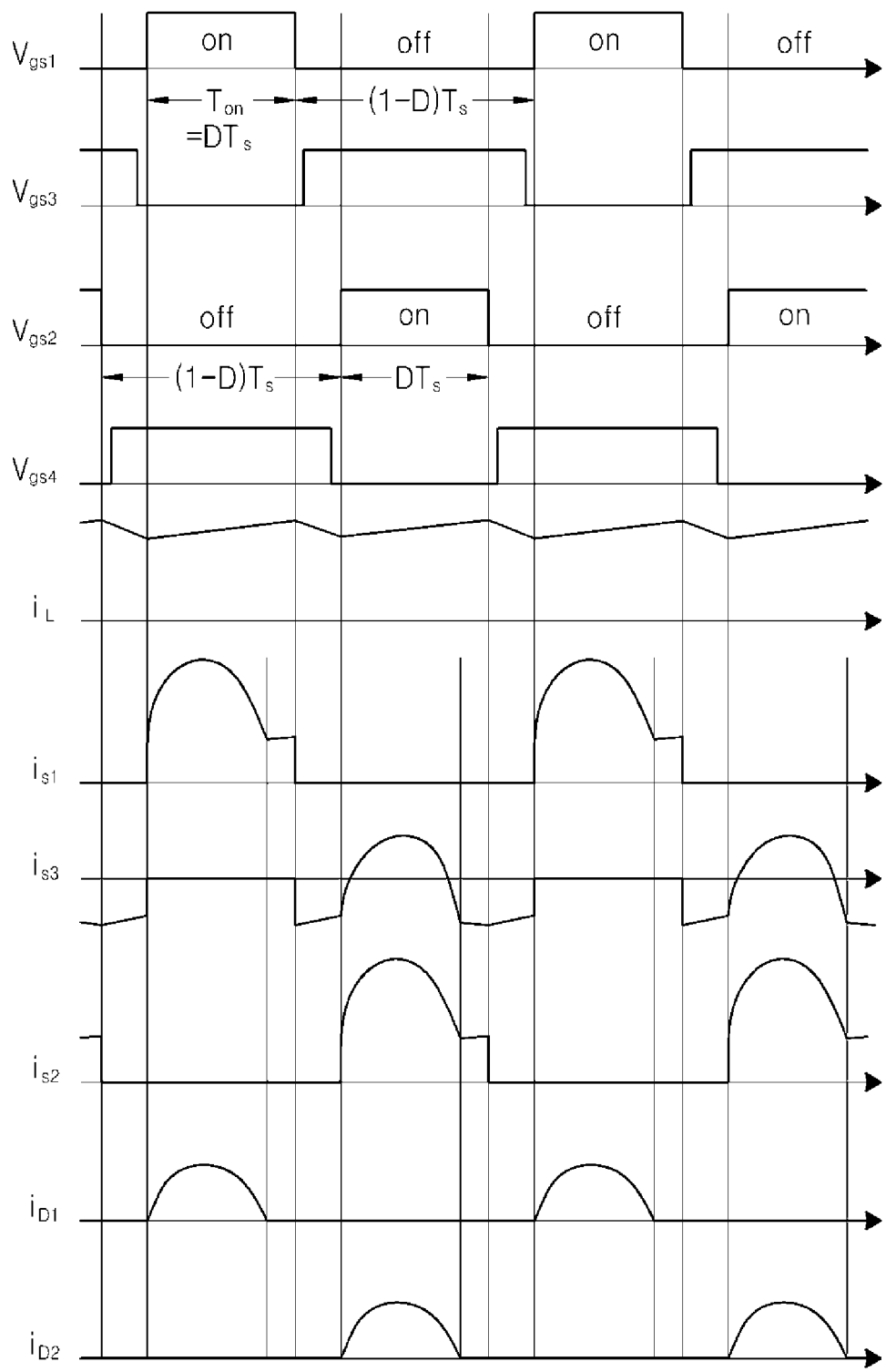
FIGS. 4A and 4B illustrate operational waveforms of an active-clamp current-source push-pull DC-DC converter in a non-overlapping mode and in an overlapping mode according to an embodiment of the present invention.
Figure 4B:
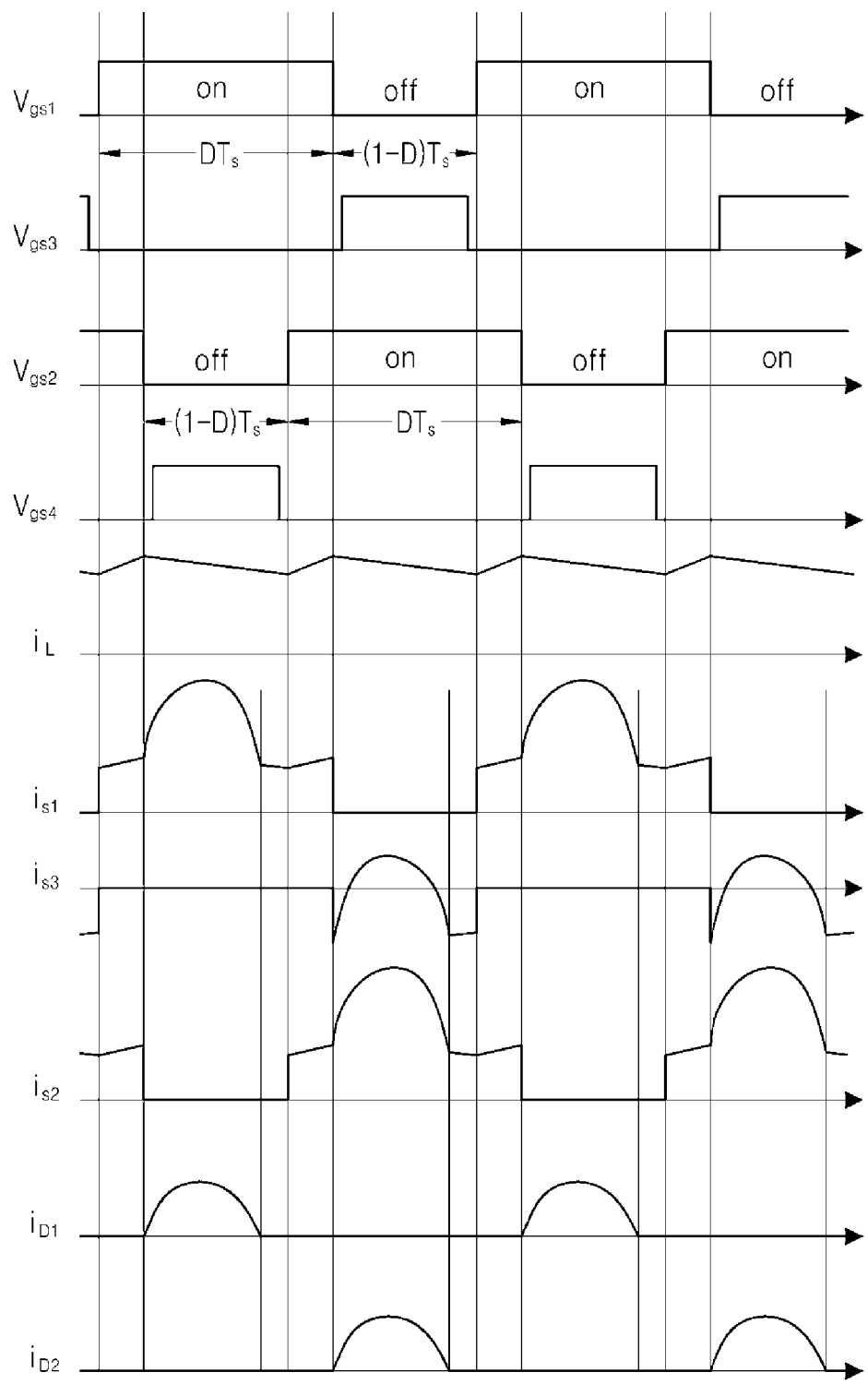

FIGS. 4A and 4B illustrate operational waveforms of the active-clamp current-source push-pull DC-DC converter illustrated in FIG. 2 in a non-overlapping mode and in an overlapping mode, according to an embodiment of the present invention.

Referring to FIGS. 2, 4A, and 4B, the main switch $S_1$ and a sub-switch $S_3$ are complementarily operated by gate driving signals $V_{gs1}$ and $V_{gs3}$ in a pre-set switching period $T_s$. The main switch $S_2$ and a sub-switch $S_4$ are operated the same as the main switch $S_1$ and the sub-switch $S_3$. The main switches $S_1$ and $S_2$ have the same duty ratio ($D=T_{on}/T_s$) and have a phase difference of half a period. In FIGS. 4A and 4B, $V_{gs2}$ and $V_{gs4}$ denote gate driving signals of the main switch $S_2$ and the sub-switch $S_4$, respectively.

Unlike the conventional current-source push-pull DC-DC converter illustrated in FIG. 1, the active-clamp current-source push-pull DC-DC converter according to an embodiment of the present invention operates even when the duty ratio of the main switches $S_1$ and $S_2$ is below 0.5. That is, when the duty ratio of the main switches $S_1$ and $S_2$ is below 0.5, the active-clamp current-source push-pull DC-DC converter operates in the non-overlapping mode as illustrated in FIG. 4A, and when the duty ratio of the main switches $S_1$ and $S_2$ is greater than 0.5, the active-clamp current-source push-pull DC-DC converter operates in the overlapping mode as illustrated in FIG. 4B. In general, the active-clamp current-source push-pull DC-DC converter operates in the overlapping mode when an input voltage $V_i$ is low and in the non-overlapping mode when the input voltage $V_i$ is high, and both modes are automatically changed.

Referring to FIG. 4A, when the active-clamp current-source push-pull DC-DC converter operates in the non-overlapping mode according to an embodiment of the present invention while one of the main switches $S_1$ and $S_2$ is on, energy is charged in the input inductor L and the clamp capacitor $C_{c1}$ or $C_{c2}$, and leakage inductances $L_{lk1}$ and $L_{lk2}$ of the transformer T, and the resonant capacitors $C_{r1}$ and $C_{r2}$ of the series-resonant full-wave rectifier 200 are series-resonant, thereby transferring energy to the secondary side of the transformer T. When both of the main switches $S_1$ and $S_2$ are off, a current, which had flowed through the input inductor L and the leakage inductances $L_{lk1}$ and $L_{lk2}$ of the transformer T, flows through the clamp capacitors $C_{c1}$ and $C_{c2}$ resulting in energy not being transferred from the primary side to the secondary side of the active-clamp current-source push-pull DC-DC converter.

A current $i_L$ flowing through the input inductor L is a ripple current having a frequency corresponding to twice a switching frequency $f_s$, and in general, this high frequency reduces an inductance of the input inductor L. The currents $i_{D1}$ and $i_{D2}$ flowing through the diodes $D_1$ and $D_2$, respectively, reach a zero current due to a series-resonance before the main switches $S_1$ and $S_2$ are off. This indicates that the diodes $D_1$ and $D_2$ are zero-current switched, and thus, a switching loss due to the diode reverse recovery characteristic does not exist.

Referring to FIG. 4B, when the active-clamp current-source push-pull DC-DC converter operates in the overlapping mode according to an embodiment of the present invention while both of the main switches $S_1$ and $S_2$ are on, energy is charged in the input inductor L, and the inductor current $i_L$ is divided and flows through the main switches $S_1$ and $S_2$. In this case, energy is not transferred from the primary side to the secondary side of the active-clamp current-source push-pull DC-DC converter. When one of the main switches $S_1$ and $S_2$ is on and the other one is off, the clamp capacitor $c_1$ or $c_2$, the leakage inductances $L_{ik1}$ and $L_{ik2}$ of the transformer T, and the resonant capacitors $C_{r1}$ and $C_{r2}$ of the series-resonant full-wave rectifier 200 are series-resonant, thereby transferring energy to the secondary side of the transformer T.

The inductor current $i_L$ illustrated in FIG. 4B is a ripple current having a frequency corresponding to twice the switching frequency $f_s$. The output diode currents $i_{D1}$ and $i_{D2}$ illustrated in FIG. 4B reach a zero current due to a series-resonance before the main switches $S_1$ and $S_2$ are off. This indicates that the diodes $D_1$ and $D_2$ are zero-current switched, and thus a switching loss due to the diode reverse recovery characteristic does not exist.

As described above, the active-clamp current-source push-pull DC-DC converter according to an embodiment of the present invention, which is illustrated in FIG. 2, can reuse energy of the leakage inductances $L_{ik1}$ and $L_{ik2}$ by the active clamp circuit 110 on the primary side providing a discharge path of the energy stored in the leakage inductances $L_{ik1}$ and $L_{ik2}$, and includes the diodes $D_1$ and $D_2$ on the secondary side being zero-current switched using the series-resonant full-wave rectifier 200. In addition, since the current $i_L$ of the input inductor L can flow through the clamp capacitors $C_{c1}$ and $C_{c2}$ of the active clamp circuit 110 when both of the main switches $S_1$ and $S_2$ are off, the active-clamp current-source push-pull DC-DC converter, according to an embodiment of the present invention, operates even for a duty ratio below 0.5, thereby having a high power conversion efficiency even for a wide input voltage range and having a lower switch voltage stress than the conventional current-source push-pull DC-DC converter.

In the active clamp circuit 110 of FIG. 2, the clamp capacitors $C_{c1}$ and $C_{c2}$ can be combined into a single clamp capacitor shared by the sub-switches $S_3$ and $S_4$, and the single clamp capacitor operates the same even if the single clamp capacitor is connected to a voltage source. In addition, as shown in sub-switch current waveforms of FIGS. 4A and 4B, since the sub-switches $S_3$ and $S_4$ have a small amplitude of currents and are zero-voltage switched, a small capacity of switch can be used for the sub-switches $S_3$ and $S_4$.

As described above, in an active-clamp current-source push-pull DC-DC converter according to embodiments of the present invention, the energy of leakage inductances can be reused by not only diodes on a secondary side of a transformer being zero-current switched using a series-resonant full-wave rectifier but also an active clamp circuit on a primary side of the transformer providing a discharge path of the energy stored in the leakage inductances.

In addition, by operating even for a duty ratio below 0.5 by flowing a current of an input inductor through capacitors of the active clamp circuit when both main switches are off, a power conversion efficiency can be increased even for a wide input voltage range, and a switch voltage stress can be reduced compared to a conventional current-source push-pull circuit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A current-source push-pull DC-DC converter comprising a primary circuit and a secondary circuit divided by a transformer, wherein the primary circuit, which is a current-source push-pull circuit, comprises an input inductor L, two main switches $S_1$ and $S_2$, and an active clamp circuit comprising two sub-switches $S_3$ and $S_4$ and clamp capacitors $C_{c1}$ and $C_{c2}$; and the secondary circuit is a full-wave output rectifier, wherein when a duty ratio of the main switches $S_1$ and $S_2$ is below 0.5, the current-source push-pull DC-DC converter operates in a non-overlapping mode while one of the main switches $S_1$ and $S_2$ is on, energy is charged in the input inductor L, and the clamp capacitor $C_{c1}$ or $C_{c2}$ and leakage inductances $L_{ik1}$ and $L_{ik2}$ of the transformer resonate.

2. The current-source push-pull DC-DC converter of claim 1, wherein the full-wave output rectifier is a series-resonant full-wave rectifier and comprises two diodes $D_1$ and $D_2$ and resonant capacitors $C_{r1}$ and $C_{r2}$.

3. The current-source push-pull DC-DC converter of claim 1, wherein the full-wave output rectifier is a center-tap full-wave rectifier and comprises two diodes $D_1$ and $D_2$.

4. The current-source push-pull DC-DC converter of claim 1, wherein the full-wave output rectifier is a full-bridge diode circuit.

5. The current-source push-pull DC-DC converter of claim 1, wherein when both of the main switches $S_1$ and $S_2$ are off in the non-overlapping mode, a current, which flowed through the input inductor L and the leakage inductances $L_{ik1}$ and $L_{ik2}$ of the transformer, flows through the clamp capacitors $C_{c1}$ and $C_{c2}$, and energy is not transferred from a primary side of the transformer to a secondary side of the transformer.

6. A current-source push-pull DC-DC converter comprising a primary circuit and a secondary circuit divided by a transformer, wherein the primary circuit, which is a current-source push-pull circuit, comprises an input inductor L, two main switches $S_1$ and $S_2$, and an active clamp circuit comprising two sub-switches $S_3$ and $S_4$ and clamp capacitors $C_{c1}$ and $C_{c2}$; and the secondary circuit is a full-wave output rectifier, wherein when the duty ratio of the main switches $S_1$ and $S_2$ is greater than 0.5, the current-source push-pull DC-DC converter operates in an overlapping mode while both of the main switches $S_1$ and $S_2$ are on, energy is charged in the input inductor L, a current $i_L$, which flowed through the input inductor L, is divided and flows through the main switches $S_1$ and $S_2$, and energy is not transferred from the primary side of the transformer to the secondary side of the transformer.

7. The current-source push-pull DC-DC converter of claim 6, wherein when one of the main switches $S_1$ and $S_2$ is on and the other one is off in the overlapping mode, the clamp capacitor $C_{c1}$ or $C_{c2}$, the leakage inductances $L_{ik1}$ and $L_{ik2}$ of the transformer, and the resonant capacitors $C_{r1}$ and $C_{r2}$ of the series-resonant full-wave rectifier are series-resonant, thereby transferring energy to the secondary side of the transformer.

* * * * *